United States Patent

[11] 3,559,584

| [72] | Inventors | Robert R. Frantz<br>Easton, Pa.;<br>Sandford G. Franklin, Milford, N.J. |
|---|---|---|
| [21] | Appl. No. | 735,680 |
| [22] | Filed | June 10, 1968 |
| [45] | Patented | Feb. 2, 1971 |
| [73] | Assignee | SI Handling Systems, Inc.<br>Easton, Pa.<br>a corporation of Pennsylvania |

[54] TOW TRUCK SWITCHING SYSTEM
12 Claims, 13 Drawing Figs.

| [52] | U.S. Cl. | 104/88 |
|---|---|---|
| [51] | Int. Cl. | B61j 3/00 |
| [50] | Field of Search | 335/(Inquired);<br>104/89; 340/38L |

[56] References Cited
UNITED STATES PATENTS

| 3,173,533 | 3/1965 | Zuck | 104/88X |
|---|---|---|---|
| 3,373,698 | 3/1968 | Bishop | 104/88 |

*Primary Examiner*—Arthur L. La Point
*Assistant Examiner*—George H. Libman
*Attorney*—Seidel and Gonda

ABSTRACT: Preset adjustable members on a vehicle electromagnetically control an electrical circuit to control switching movement of a vehicle whereby no part of the vehicle makes physical contact with the switch-controlled mechanism except for contact between a tow pin on the vehicle and a diverter.

INVENTORS.
ROBERT R. FRANZ
SANDFORD G. FRANKLIN
BY
Seidel & Gonda
ATTORNEYS.

TOW TRUCK SWITCHING SYSTEM

The present invention relates to a tow truck system, such as the system disclosed in U.S. Pat. No. 3,045,610 or 3,261,300. In FIG. 25 of the first-mentioned patent, there is illustrated mechanism mounted below floor level and adapted to be selectively raised for physical contact with a portion of the vehicle. In U.S. Pat. No. 3,261,300 there is illustrated in FIG. 3 a mechanism which projects partially above floor level for physical contact with a portion of the vehicle. In each of said patents, said physical contact initiates switching movement of the vehicle.

In certain environments, a tow truck system is not adapted to have a mechanism below floor level for physical contact with the vehicle for the purpose of initiating switching movement. In some environments, the reference surface such as a floor will not accommodate a device adapted to have physical contact with a portion of the vehicle. In other environments, projections above floor level are considered a safety hazard. In other environments, the air is polluted and dusty, thereby requiring substantial maintenance on components which are intended to project above floor level for physical contact with a portion of the vehicle. The system of the present invention eliminates switch control mechanisms which project upwardly from a reference surface such as a floor or physical contact with a vehicle to initiate switching movement. In accordance with the present invention, switching movement is initiated electromagnetically while at the same time having the desirable attributes of the systems disclosed in said patents.

In accordance with the present invention, coils are adjustably positioned below floor level and have positions of varying distances from a main slot. If the number and type of cart selections at a shunt slot in a system in small, only three coils would be required. Since most of the systems presently being installed desire to have a large number of selections, the present invention is being described so as to have more than three such coils on each side of the main slot.

When a current is simultaneously induced in the coils, a circuit discriminates and selects the signals which close a circuit to a solenoid operator for the diverter. The circuit of the present invention is preferably a DC circuit so as to eliminate the necessity for installing wires underground from an AC source. The coils are preferably supported in a manner for ease of selective positioning and maintenance. For ease of installation, the coils are preferably supported in a single housing which extends below and to opposite sides of the main slot. A current is preferably induced in the coils by selector rods on a vehicle having a tip portion which is made of magnetic or magnetizable material.

It is an object of the present invention to provide a novel tow truck system.

It is another object of the present invention to provide a tow truck system wherein switching movement of a vehicle is controlled by electromagnetically closing an electronic circuit.

It is another object of the present invention to provide a two truck system wherein switching control is accomplished without physical contact between a part of the switch mechanism and the vehicle.

It is another object of the present invention to provide an electronic circuit for controlling switching movement of a vehicle in a manner so that physical contact between the vehicle and a portion of the switching control is avoided.

It is another object of the present invention to provide an electronic circuit for controlling switching movement of a vehicle which can discriminate and select signals from concurrently generated signals by comparison techniques.

Other objects will appear hereinafter.

For the purpose of illustrating the invention, there is shown in the drawings a form which is presently preferred, it being understood, however, that this invention is not limited to the precise arrangements and instrumentalities shown.

Figures 1, 3:
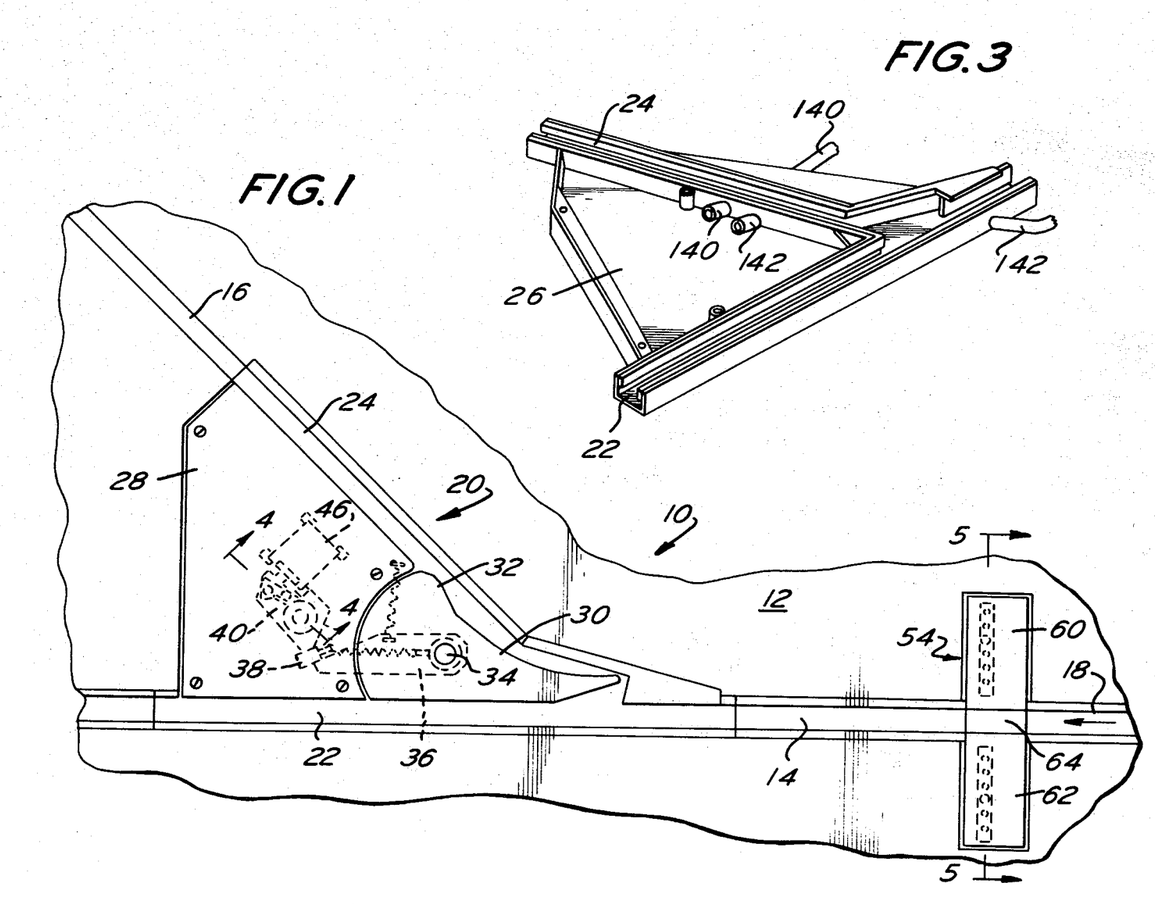
FIG. 1 is a partial top plan view of a portion of the system of the present invention.
FIG. 3 is a perspective view of the housing for the switchplate assembly.

Referring to the drawing in detail, wherein like numerals indicate like elements, there is shown in FIG. 1 a portion of the system of the present invention designated generally as 10. The system 10 is shown in conjunction with a reference surface such as floor 12 having a main slot 14 therein. The main slot 14 is intersected at spaced points therealong by shunt slots 16 which may extend to either side of the main slot 14. Only one shunt slot 16 is illustrated in the drawing. In FIG. 1, a vehicle is intended to be moving in the direction of arrow 18.

At the intersection of main slot 14 and shunt slot 16, there is provided a switchplate assembly designated generally as 20. As shown more clearly in FIG. 3, the housing for the switchplate assembly includes a channel 22 which forms a part of the main slot 14 and a second channel 24 which forms a part of the shunt slot 16. The housing includes a chamber 26 defined by a bottom wall and upright sidewalls. The housing includes a cover 28 so that the chamber 28 will be completely enclosed. By having a completely enclosed chamber 26, debris in the channels 22 and 24 cannot enter the same and will therefore be substantially dustproof.

The mechanisms and devices within chamber 26 are preferably supported by the bottom surface of cover 28. Thus, a switch member such as a diverter or switchplate 30 is supported by cover 28 for rotation about the axis of pin 34. An arm 36 is fixedly secured to pin 34. The manner in which pin 34 is supported from cover 28 is not illustrated since it will obscure the other components illustrated in FIGS. 1 and 2.

The free end of arm 36 is in abutting contact with a latch member 38 on arm 40. Arm 40 is adapted to rotate about the longitudinal axis of pin 42 which in turn is supported from the cover 28. The plunger 44 of a solenoid 46 is coupled to arm 40 by a pin 45. Solenoid 46 is supported by the cover 28 and supports a microswitch 48 adapted to be closed by abutment 47 on arm 40 when the solenoid 46 is excited.

Figure 2:
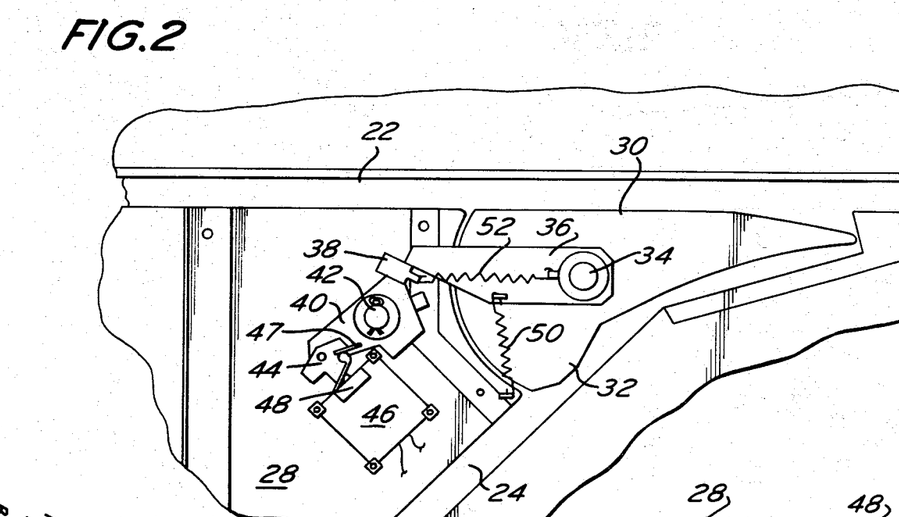
FIG. 2 is a bottom plan view of the switchplate assembly shown in FIG. 1.
Figure 4:
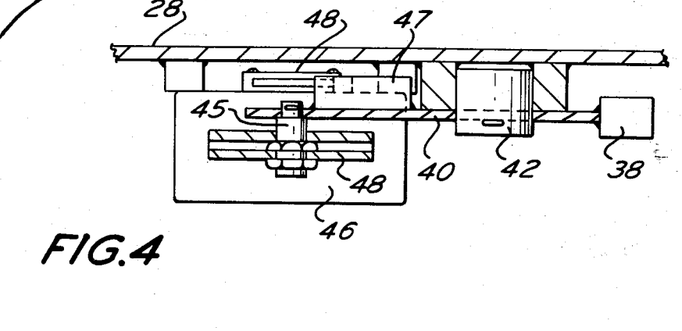
FIG. 4 is a sectional view taken along the line 4–4 in FIG. 1.

In FIG. 2, the switchplate 30 is biased in a counterclockwise direction by spring 50. Such rotation is prevented by contact between arm 36 and latch member 38. Arm 40 is biased to the position shown in FIG. 2 by spring 52. While the switch member controlled by solenoid 46 is illustrated as being a switchplate 30, other switch members may be utilized in place thereof. Switchplate 30 is preferably provided with a cam 32 for a purpose well known and to be described hereinafter.

Upstream from the intersection of slots 14 and 16, there is provided a control housing designated generally as 54 having a chamber 56 therein. See FIGS. 5 and 7. The housing 54 is provided with a bottom wall 58 and upright sidewalls around its periphery. Housing 54 is closed at the top by a cover having sections 60 and 62 on opposite sides of a U-shaped channel 64. Channel 64 forms a part of the main slot 14.

Figure 5:
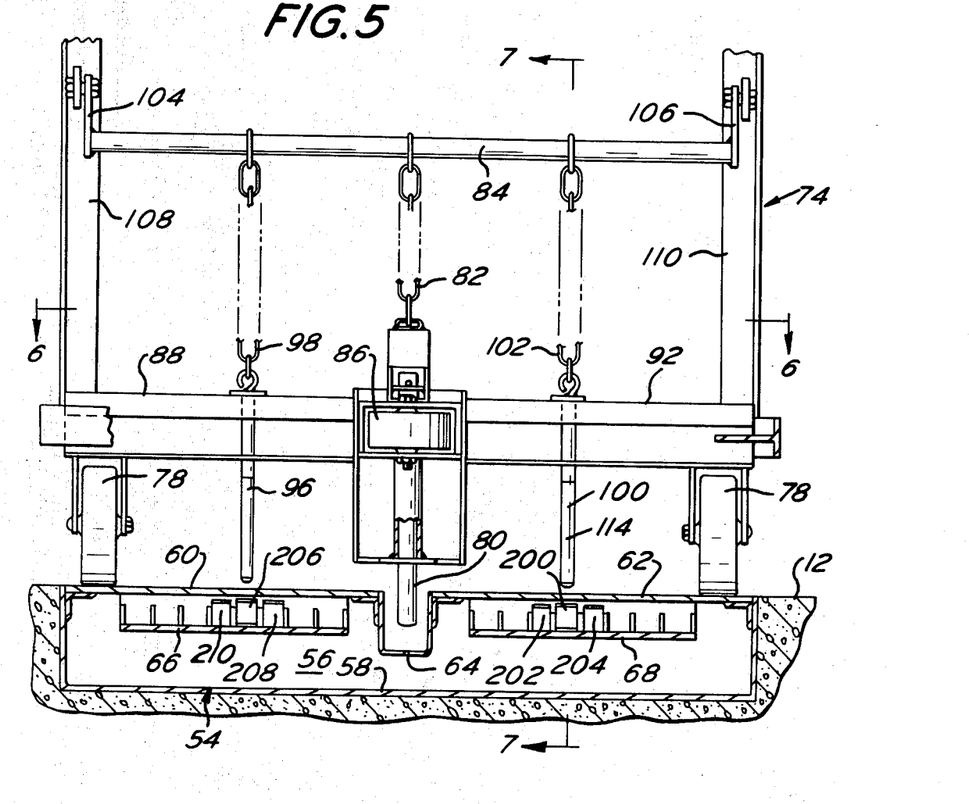
FIG. 5 is a sectional view taken along the line 5–5 in FIG. 1.
Figure 6:
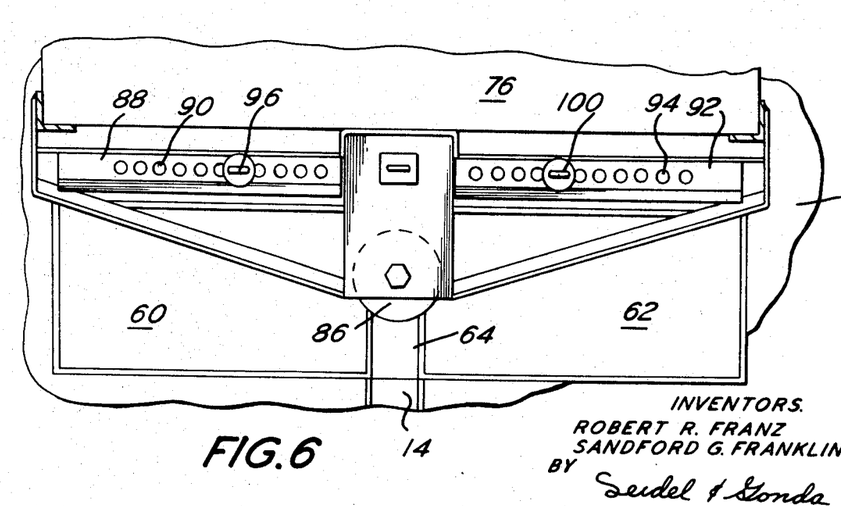
FIG. 6 is a sectional view along the line 6–6 in FIG. 5.
Figures 7, 8, 9:
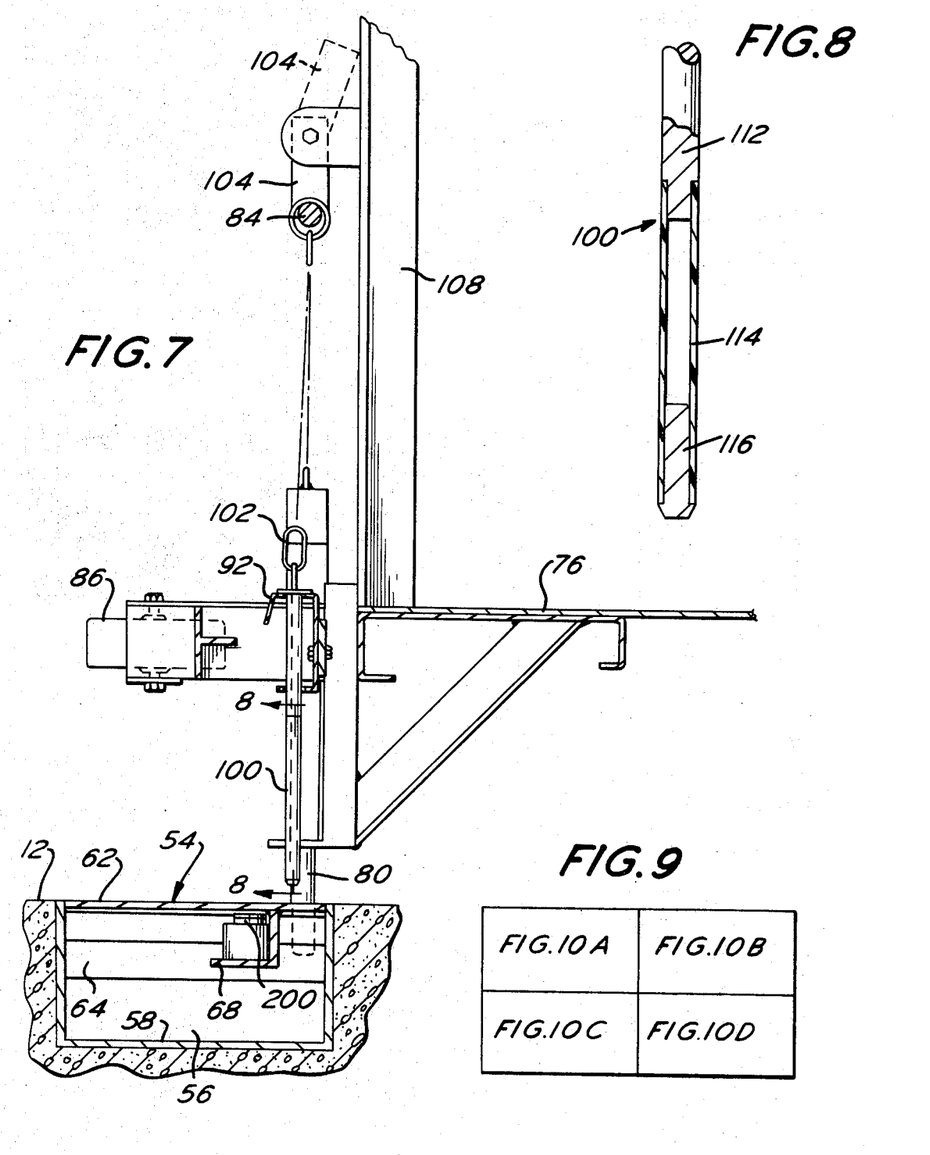
FIG. 7 is a sectional view taken along the line 7–7 in FIG. 5.
FIG. 8 is a sectional view taken along the line 8–8 in FIG 7.
FIG. 9 is a circuit diagram for the circuitry in FIGS. 10A, 10B, 10C and 10D.
Figure 10A:
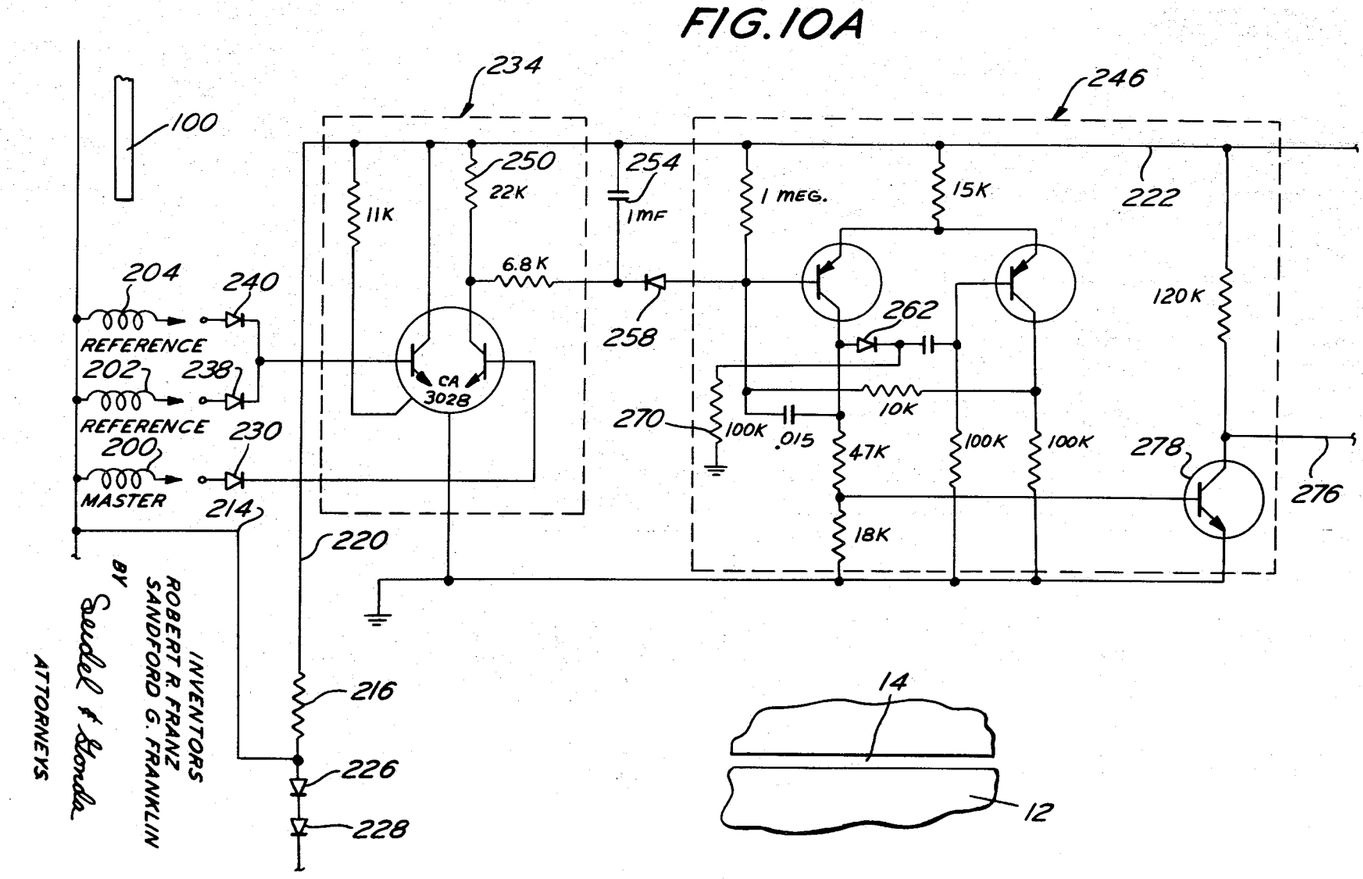
Figure 10B:
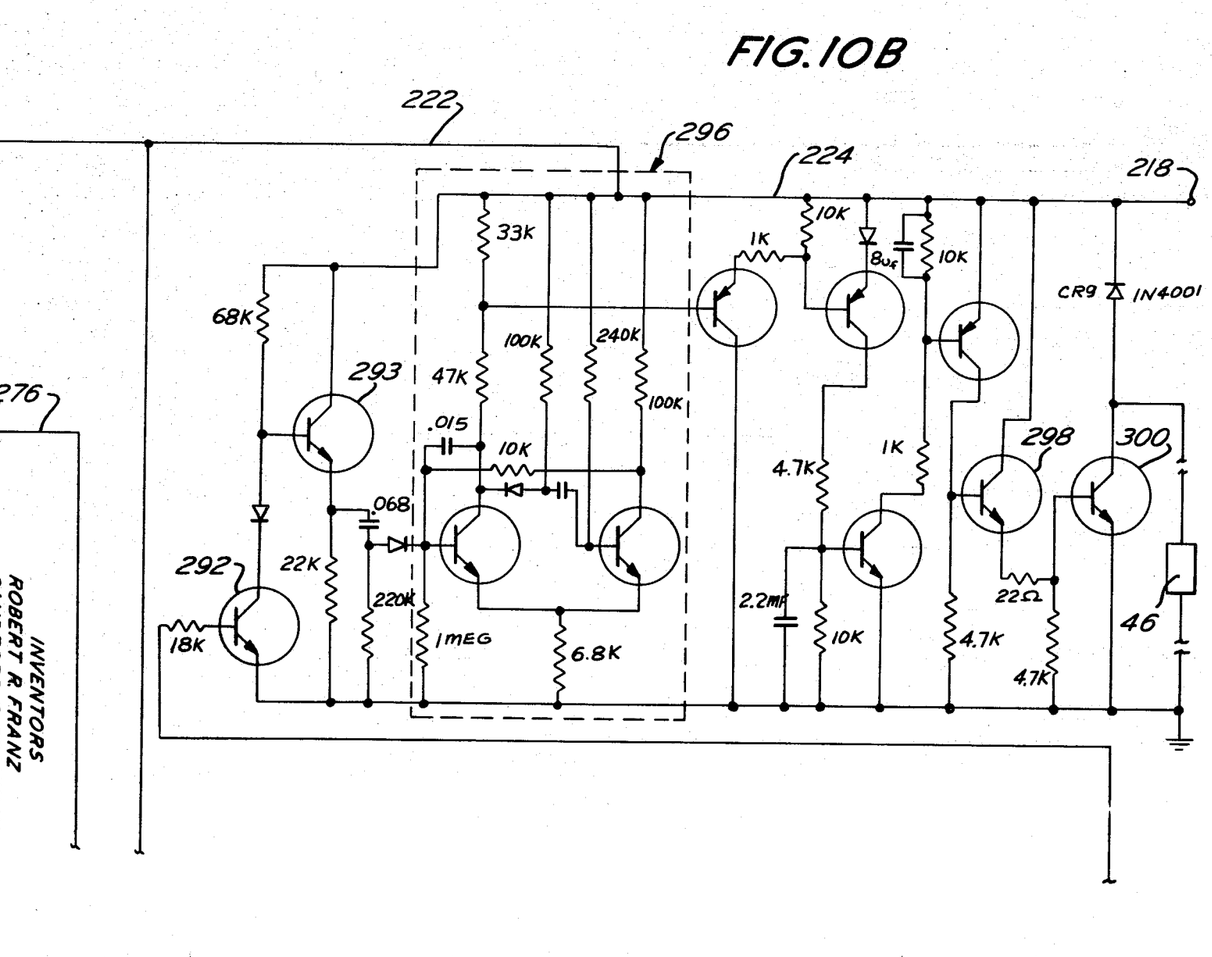
Figure 10C:
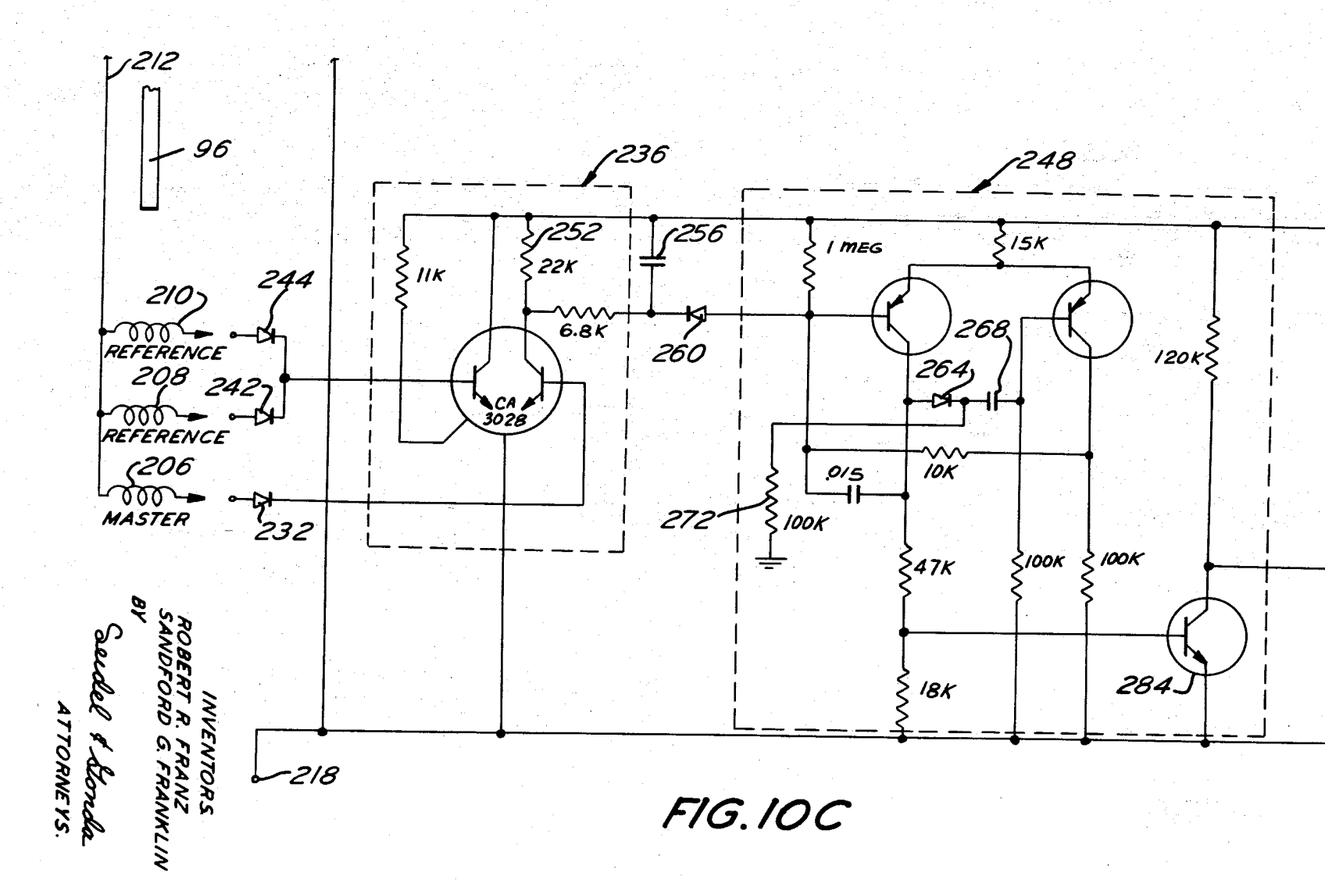
Figure 10D:
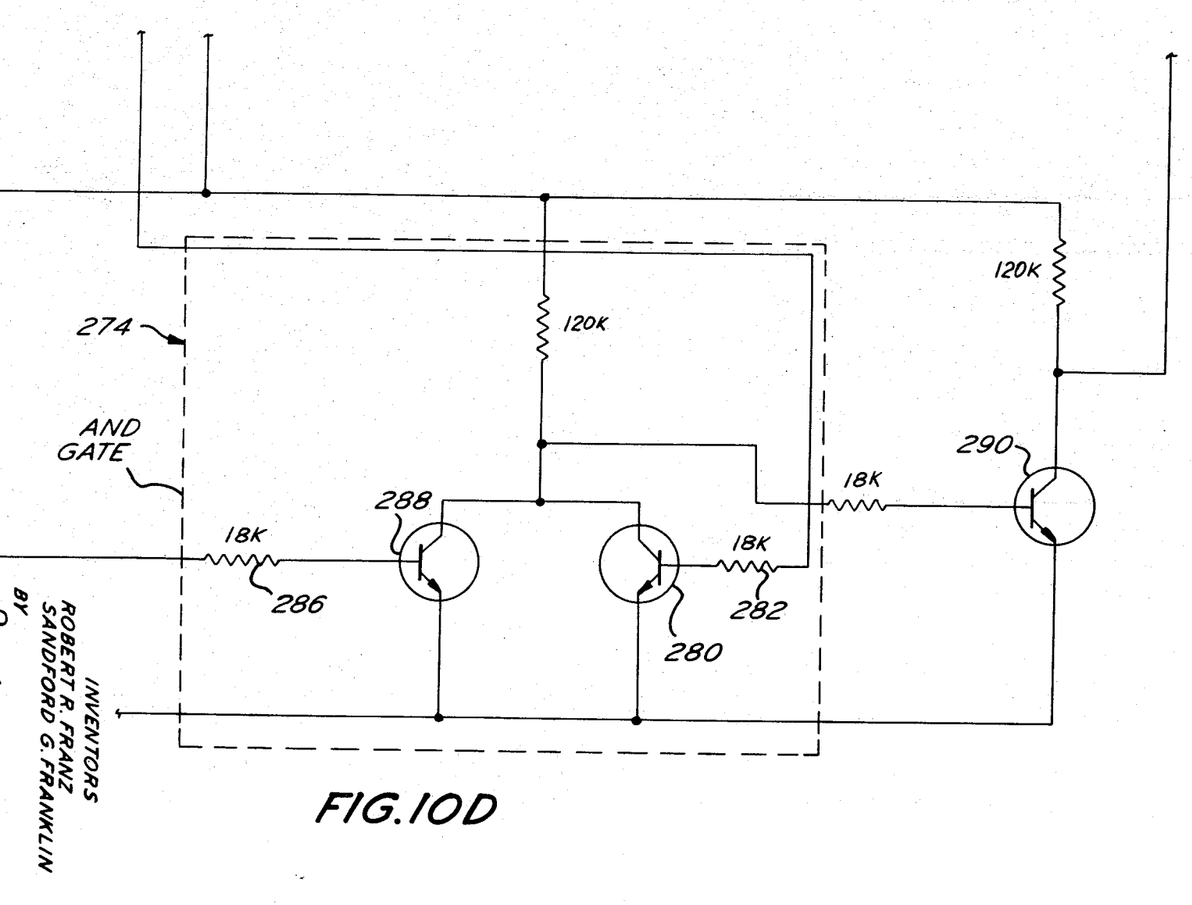

Coil supports 66 and 68 are provided within chamber 56 on opposite sides of the channel 64. Support 66 is supported in depending manner from the cover section 60. Support 68 is supported in depending relation from the cover section 62. Each of the supports 66 and 68 include a means such as pockets at spaced points therealong for supporting a coil at different distances from the channel 64.

A vehicle designated generally as 74 is illustrated for use with the system 10. Other vehicles may be utilized. Vehicle 74 includes a platform 76 mounted on wheels 78. The lower end of a tow pin 80 extends into the main slot 14 for contact with a conveyor, not shown. The two pin 80 is supported at the front of the vehicle 74 by means of a chain 82 suspended from a bar 84. The front end of the vehicle 74 may be provided with a bumper wheel 86.

Racks 88 and 92 are provided on the vehicle 74 on opposite sides of the two pin 80. Rack 88 is provided with holes 90 at spaced points therealong. Rack 92 is provided with holes 94 at spaced points therealong. A selector rod 96 extends through one of the holes in rack 88 and is supported by bar 84 by means of a chain 98. A selector rod 100 extends through one of the holes in rack 92 and is supported from bar 84 by chain 102.

The bar 84 is provided with bracket arms 104 and 106 at its ends. The bracket arms are rotatably supported by upright members 108 and 110 on opposite sides of the platform 76 at the front end of the vehicle. Thus, bar 104 may be moved from the solid line position in FIG. 7 to the phantom position in FIG. 7. When the bracket arm 104 is moved to the phantom position in FIG. 7, such rotation raises the tow pin 80 and the selector rods 96 and 100.

As shown more clearly in FIG. 8, selector rod 100 includes a metal rod 112 which may be made from any convenient material connected to one end of a plastic sleeve 114. The terminal end portion 116, made from a magnetizable material such as Alnico or other magnetic material, is connected to the opposite end of sleeve 114. Selector rod 96 is similarly constructed.

It is apparent from the foregoing that the energization of the solenoid 46 depends upon some form of switching which will be responsive to the passage of the vehicle. In accordance with the present invention, the energization of the solenoid 46 is triggered by a moving magnet fixed to the car. The presence of the magnet is detected by a coil when magnetic lines of force induce a voltage of sufficient strength to trigger the operation of associated electronic circuitry which in turn energizes the solenoid 46.

The concept of using magnets attached to a vehicle is not novel per se. However, prior art systems have had severe limitations. The magnets on the vehicles must either be quite large or be positioned very close to the floor so as to trigger the sensors located below it. The positioning of the magnets too close to the floor is a severe restriction in industrial plants where a reasonable clearance is desirable in order to avoid objects which may be accidentally placed in the path of the vehicle. The use of large magnets spaced further from the floor creates at least two additional difficulties. Large magnets tend to pick up magnetic material such as iron filing, and the field of influence of the magnets is very large. This means that the distance between adjacent coding channels must be kept relatively large. In a system such as that described herein, wherein the coding depends upon the spacing of two selector rods on the front of the vehicle, the combined width of all of the coding channels cannot be larger than the width of the vehicle. The result is that the number of coding channels is severely limited.

To be commercially practical, the coding system must be capable of providing a large number of channels. Since the coding device must be multiplied by the number of carts, the cost must be kept low. Indeed, many installations use hundreds of carts. In addition, the coding method must also permit the use of large numbers of codes and the system must be relatively simple to operate. In addition, the coding system must be capable of withstanding the environmental conditions encountered in an open truck dock and other industrial environments and, at the same time, exhibit a high reliability of operation. The present electronic circuit for energizing the solenoid 46 meets the foregoing requirements and overcomes the aforesaid disadvantages of previous magnetic systems.

In accordance with the present invention, the selector rods 96 and 100 are positioned in preselected coding holes 90 and 94 so as to trigger coils positioned below the floor in order to energize the solenoid 46. In a preferred embodiment of this invention, there are 14 coding holes 90 and 14 coding holes 94 that can be coded to permit as many as 196 numeric combinations based upon a decimal system of coding. The 28 holes 90 and 94 can be spaced on 1 inch centers without incurring interference between adjacent coils. In addition, the magnets can be positioned one-half inch or more above the floor so as to avoid the aforementioned problem of lack of ground clearance.

When a coil is positioned beneath the floor, the passage of a magnet above the coil generates a small voltage which may be amplified by an electronic circuit. If a first coil is positioned beneath the magnet supported at the end of selector rod 96 and a second coil is positioned beneath the magnet supported at the end of selector rod 100, the resultant voltages generated in the coils can be added together, amplified and used to activate solenoid 46. The difficulty with this system is that it does not take into account selector rods which are out of position due to lateral vehicle tolerances. For example, some vehicles 74 may have misaligned frames so that the longitudinal axis of the vehicle does not track parallel to the tow chain, or the rods 96 and 100 may be bent. The probes therefore do not simultaneously pass over the coils, resulting in the nonaddition of the voltage pulses, and the failure to energize solenoid 46.

Analysis of such a system indicates that the failure to energize the solenoid is due to the system's dependence upon the waveform of the voltage developed in the coils. The waveform is influenced by the magnetic strength of the magnets, the vehicle speed, the alignment or misalignment of the vehicle, the height of the rod above the floor, and other associated tolerances in the system. In addition, such a system does not permit coils to be spaced as close as one inch since a magnet suspended at the end of one of the rods may generate unwanted voltage in a closely adjacent coil thereby energizing the solenoid 46 of the wrong diverter.

The present invention overcomes the aforesaid disadvantages of prior systems by incorporating an electronic switching circuit for energizing the solenoid 46 which is not dependent upon the wave characteristics of the voltage developed in the coils. The present invention uses three coils which are responsive to the passage of a magnet supported on one of the rods 96 or 100 and uses the difference signals between the coils to discriminate as to whether a rod is correctly positioned. Basically, each magnet supported at the end of rods 96 and 100 is following what may be described as a sensing channel. If the magnet is properly positioned in the sensing channel, it will pass over the center of one of three coils which are spaced on 1 inch centers. The center coil may be referred to as the master coil and is placed directly in the channel to be sensed. The other two coils may be referred to as reference coils, and each is positioned in the sensing channel adjacent to the one being sensed. By proper switching, any coil can be made either the master coil or a reference coil. Thus, the system requires no more coils than there are coding holes. Thus, in the embodiment described, only 28 coils are required.

The operation of this novel sensing system will become more apparent by referring to FIG. 9 wherein a schematic drawing of the electronic circuitry for energizing a solenoid 46 is illustrated.

Two sets of three coils are shown. The coils 200, 202 and 204 are located in pockets on the coil support 68 and hence will have voltages induced in them by the magnet supported at the end of rod 100. The coils 206, 208 and 210 are positioned in pockets on the coil support 66 and hence will have voltages induced in them by the magnet at the end of rod 96. As best shown in FIG. 5, the master coil 200 is located between the reference coils 202 and 204. In a like manner, the master coil 206 is located between the reference coils 208 and 210. The physical position of the master coils 200 and 206 is not shown in FIG. 9 which is merely a schematic drawing of the electrical circuitry.

The position of the master coils 200 and 206 on the coil supports 66 and 68 determines the sensing channel. Accordingly, the selector rods 96 and 100 are correctly positioned in the same sensing channel so that they presumptively will pass directly over the master coils 200 and 206. One terminal of each of the coils 200—210 is directly connected through the conductors 212 and 214 and the resistor 216 to one terminal of a direct current voltage source 218. Conductors 220, 222 and 224 provide the connection between the resistor 216 and one terminal of the direct current source. Resistor 216 is also connected to the diodes 226 and 228 which are connected to the opposite terminal of the source 218. In the preferred embodiment, the voltage source 218 is a battery, although other types of voltage sources may be substituted. Indeed, it is an advantage of the present invention that it is capable of battery operation. Thus, the electronic circuit is designed for quiescent or standby operation at less than 2.8 milliamperes or less than 35 milliwatts which will not significantly drain the battery. The solenoid 46 has only a 30 millisecond pulse supplied to it which does not apply a heavy load to the battery. This results in long battery life.

As indicated above, it is an advantage of the present system that it requires no more coils than there are coding channels. This is accomplished by appropriately switching in the coils 200—210 to the rest of the electronic circuitry. Thus, in the appropriate situation one of the reference coils may become a master coil and its two adjacent coils become the reference coils by appropriately connecting it to the rest of the electronic circuit. In the embodiment shown, the master coils 200 and 206 have been connected, as by switches (not shown) to the diodes 230 and 232 which are connected in series with the base of one of the NPN transistors which form a part of the difference amplifiers 234 and 236. Difference amplifiers 234 and 236 are designated generally as being enclosed within the dotted line. Reference coils 202 and 204 are connected to diodes 238 and 240 respectively. The cathodes of diodes 238 and 240 are commonly connected to the base of another NPN transistor in the difference amplifier 234. In a like manner, the coils 208 and 210 are connected to the diodes 242 and 244 whose cathodes are commonly connected to another NPN transistor in the difference amplifier 236. The diodes 230, 232, 238, 240, 242 and 244 function to prevent the back voltage of the coils 200—210 from being applied to the bases of the difference amplifiers 234 and 236.

When the system described herein is operating, each magnet suspended at the end of selector rods 96 and 100 is moving through what may be regarded as a sensing channel and should pass over the center coil of the three coils. As described herein, the center coil is the master coil which has been placed directly in line with the sensing channel. The reference coils are placed on one inch centers and hence are aligned with the adjacent sensing channels. Each master coil 200 and 206 is connected to one side of its respective difference amplifier and the two reference coils are commonly connected to the other input terminal of their respective difference amplifiers 234 and 236. The difference amplifiers 234 and 236 each amplify only the difference between the two signals applied to their two inputs. Accordingly, if these two inputs are identical, there will be no output from the amplifier. Such a condition would exist when one of the rods 96 or 100 is displaced because of vehicle tolerances or misalignment to a position exactly between the channels.

If the rod displacement is so gross as to position a rod closer to one of the reference channels than to the master channel, then the difference amplifier will put out a pulse of the wrong polarity which is rejected by the remainder of the circuit for reasons explained below. Clearly then, the use of difference amplifiers permits the coding system to sharply discriminate at the centerline between adjacent channels. Once a rod is improperly displaced so as to be in between channels or over the wrong coil, the system rejects it. Thus, the difference amplifiers 234 and 236 compare voltage pulses to make a determination of the presence of a magnet and are not generally concerned with wave amplitude, wave shape, magnetic strength, probe height and cart speed variations which as explained above create difficult problems.

The operation of a difference amplifier is generally well known. Accordingly, reference is made to FIG. 9 for its showing of how the circuit is to be connected but no description of the operation of the circuit is provided.

It should be recognized that the coding system being used to energize a particular solenoid 46 is basically an AND logic system. Thus, the rods 96 and 100 must be correctly positioned over the master coils 200 and 206 in order to energize the solenoid 46. The circuit for implementing such a logic system is as follows:

As is conventional, the output in each of difference amplifiers 234 and 236 will be a pulse of a predetermined polarity, assuming that the proper master coils 200 and 206 have been influenced by the magnets at the ends of rods 96 and 100. In the event that one or both of the rods is improperly positioned, a pulse of the opposite polarity will be generated. Such a pulse cannot be accepted by the remainder of the circuit because of the bias on the circuit elements.

The circuit also consists of two time delay circuits 246 and 248 which are coupled to the output resistors 250 and 252 of the difference amplifiers 234 and 236 by the capacitors 254 and 256 and the diodes 258 and 260. Each of the time delay circuits 246 and 248 consists of a monostable multivibrator whose function is well known and need not be described in detail. The RC circuits consisting of diodes 262 and 264, capacitors 266 and 268, and resistors 270 and 272 are connected in the collector-base circuit of the PNP transistors of the multivibrator circuits 246 and 248 to provide a time delay. The time delay extends the time period of the pulse generated by the difference amplifiers 234 and 236. The manner in which the RC circuit functions to provide the necessary time delay for a monostable multivibrator is well known and need not be described in detail. The purpose of such a time delay circuit which lengthens the time base of the signal generated in each coil is to permit a large amount of vehicle skew and eliminate the problems of frame misalignment and skew due to the curving of the two chain. In other words, the foreshortening of the time base of the pulse generated by the difference amplifiers 234 and 236 because of skew or misalignment will have no effect on the electronic circuit since any such foreshortened pulse will be stretched by the time delay circuits 246 and 248.

As shown, the output pulse of time delay circuit 246 is coupled to the AND circuit 274 by conductor 276 which extends from the collector of NPN driving transistors 278 to the base of NPN transistor 280 through resistor 282. In the same manner, the output pulse of time delay circuit 248 is coupled from the collector of NPN driving transistor 284 through the resistor 286 to the base of NPN transistor 288.

The AND circuit 274 is conventional in that the transistors 280 and 288 are biased so that an output pulse is generated only upon the existence of coincident pulses being applied to the bases of transistors 280 and 288. Such coincident pulses, of course, cannot exist except as derived fundamentally from the coils 200—210.

The output pulse of the AND circuit 274 is amplified by the transistors 290, 292 and 293 connected in circuit as shown in FIG. 9. This amplified pulse is used to trigger the one-shot multivibrator 296. The one-shot multivibrator 296 is connected as shown in FIG. 9 and need not be described in detail since such devices are well known both as to structure and function. The output of one-shot multivibrator 298 is amplified by the remainder of the circuit which includes a high-power section consisting of transistors 298 and 300 which ultimately respond to the output of one-shot multivibrator 296 to apply a pulse to the solenoid 46. In accordance with the present invention, it has been found that a pulse of approximately 30 milliseconds will operate the diverter solenoid 46. Of course, adjustments can be made in the circuit parameters to provide longer pulses if desired. The advantage of the short 30 millisecond pulse, as explained above, is that it increases battery life.

While the present invention has been described in its preferred embodiment, including the AND circuit 274, it should be understood that it is not so limited. Thus, an OR circuit can be substituted for the AND circuit. Thus, the solenoid 46 can be made responsive to the proper positioning of selector rod 96 or selector rod 100.

It should be understood that the circuit illustrated in FIG. 9 represents an illustration of a single circuit for operating one solenoid. This circuit is duplicated at each solenoid location. The particular coils which are switched into the circuit at any one location can be controlled by a central switch panel. Or, if desired, the circuit can be interfaced with a computer for controlling the distribution of vehicles through a large facility.

While the present invention has been described in terms of inducing a small voltage in a coil, it should also be understood that other methods of detecting the presence of the selector rods 96 and 100 are possible. For example, the coils could be made part of an oscillator tank circuit which operates at radio frequencies. The presence of a magnetic field carried by the rods 96 and 100 would change the reluctance of the coils thereby varying the circuit frequency. Such variations can be detected and compared by any of several types of circuits, including bridge circuits.

A circuit used to detect the change in reluctance in the coil of its tank circuit would be particularly useful in a system operating at low speed. Obviously, the system illustrated in FIG. 9 requires the generation of a voltage of minimum amplitude in the coils 200—210. In accordance with conventional electrical principles, the amplitude of the voltage so developed depends upon the speed at which the rods 96 and 100 are moving. It has been determined that a speed of 30 feet per minute or greater will generate a voltage of sufficient amplitude in the coils 200—210 that can be detected by the difference circuits 234 and 236. At speed under 30 feet per minute, the signal-to-noise ratio becomes too high.

By way of specific example, but not of limitation, the values of the circuit elements are illustrated in FIG. 9. Unless otherwise noted, all NPN transistors are of type 2N 3705; PNP transistors are of type 2N 3701; and all diodes of type 1N 914. Those skilled in the art will readily recognize that variations and modifications in the value of the circuit elements as well as the circuit elements themselves can be made without departing from the present invention.

The operation of the system is as follows:

It will be assumed that the location of the coils is that required to cause the vehicle 74 to be transferred from movement along main slot 14 to movement along the shunt slot 16. In order to effect such switching movement, the selector rods 96 and 100 will be positioned as illustrated in FIG. 5 so that the tip portions of the rods will theoretically pass directly over the coils 200 and 206.

The voltages induced in the coils are compared, the proper signals are selected and then amplified to operate the solenoid 46 as described above. Operation of solenoid 46 enables the diverter 30 to move due to spring 52 to a position wherein it obstructs the main slot 14. The first vehicle which contacts the diverter 30 will be shunted in slot 16.

When diverter 30 obstructs main slot 14, can 32 obstructs slot 16. As the tow pin 80 moves along channel 24, it moves cam 32 out of its way thereby resetting the diverter 30 so that it assumes the position illustrated in FIG. 1.

For simplicity of illustration, wires, plugs, and the like have not been illustrated in the drawing. All of the circuit illustrated in FIG. 9 is preferably mounted within the housing 74 except for the solenoid 46 which is disposed in chamber 26 and selector switches for choosing the particular coils for the sensing channel which are mounted in any desired location such as a control panel. To facilitate coupling of solenoid 46 to the circuit by electrical conductors, conduits 140 and 142 which pass beneath the channels 22 and 24 are provided as shown more clearly in FIG. 3.

It will be apparent that the present invention permits multiple combinations to be selected at any shunt slot. Thus, it is possible to cause switching of carts into a single shunt slot even through the trip rods are set for a different shunt slot channel by selective actuation of remote switches to couple various coils into the circuit. Substantially increased versatility is thereby provided. For example, the destination of a cart can be changed while the cart is moving.

Hereinafter, coils 200—210 may be referred to as an electrical circuit component responsive to the pressure of a portion of the vehicle 74 such as rod 96 and/or rod 100. Hereinafter, the circuit of FIG. 9 and the elements thereof may be referred to as an actuator for the diverter 20. Hereinafter the cover sections 60 and/or 62 may be referred to as a nonmagnetic means isolating the coils from physical contact with a portion of the vehicle 74.

The present invention may be embodied in other specific forms without departing from the spirit or essential attributes thereof and, accordingly, reference should be made to the appended claims, rather than to the foregoing specification as indicating the scope of the invention.

We claim:

1. A vehicle-switching system comprising a main slot intersected by at least one shunt slot at spaced points therealong, a diverter at said intersection operable to cause a vehicle to be transferred from movement along the main slot to movement along the shunt slot, an actuator for said diverter including an electronic circuit which discriminates between concurrently generated signals from a component responsive to the presence of a portion of a vehicle moving along the main slot, at least three of said circuit components in the form of coils being disposed on opposite side of the main slot, said circuit including means for comparing the signals induced in said coils and selecting the signal from one coil on each side of said main slot for amplification.

2. A system in accordance with claim 1 including at least three of said components at selected positions spaced different distances from the main slot.

3. A system in accordance with claim 1 wherein said components are coils, said circuit means including a difference amplifier connected to a solenoid operator for said diverter by circuitry for extending the time period of each selected signal.

4. A system in accordance with claim 1 including a vehicle having a tow pin extending into said main slot and adapted to enter the shunt slot, said vehicle having a selectively adjustable device for electromagnetically activating said component.

5. A system in accordance with claim 4 wherein said device includes a selector rod having a tip portion made from a magnetizable material.

6. A system in accordance with claim 1 wherein said actuator includes a housing extending to opposite sides of said main slot, said housing having channels forming a continuation of the main slot, and said circuit including at least six of said components, each component being a coil thereof, said coils being on each side of said channels, and nonmagnetic cover means for said housing.

7. A vehicle-switching system comprising a main slot intersected by at least one shunt slot at spaced points therealong, a diverter at said intersection operable to cause a vehicle to be transferred from movement along the main slot to movement along a shunt slot, an actuator for said diverter including an electronic circuit, said circuit including electromagnetic sensor means for detecting the presence of a vehicle supported magnetic field moving in a preselected sensing channel, discrimination means responsive to said sensor means for sharply discriminating between said magnetic field being primarily in the selector sensing channel and being primarily outside said sensing channel, said sensor means including a main sensor and adjacent reference sensors, said discrimination means including circuit means for generating an output directly related to the difference between the signal in said main sensor and the signals in said reference sensors.

8. A vehicle-switching system in accordance with claim 7 wherein said circuit includes a second electromagnetic sensor means for detecting the presence of a second vehicle-supported magnetic field moving in a second preselected channel, second discrimination means responsive to said second sensor means for sharply discriminating between said second magnetic field being primarily in the second sensing channel and being primarily outside said second sensing channel, and coincident gate means responsive only to the presence of both magnetic fields being in their selected sensing channels.

9. A vehicle-switching system in accordance with claim 7 wherein said electronic circuit includes time delay circuit means for shaping the output wave of said discrimination means so that the circuit is not affected by incidental vehicle skew and misalignment.

10. A vehicle-switching system in accordance with claim 8 wherein said electronic circuit includes time delay circuits intermediate all of said discrimination means and said coincident gate for shaping the output wave of said discrimination means so that the circuit is not affected by incidental vehicle skew and misalignment.

11. A vehicle-switching system in accordance with claim 7 wherein said main sensor and adjacent reference sensors are inductor coils in which a voltage pulse is induced by the magnetic field moving with said vehicle.

12. A vehicle-switching system in accordance with claim 7 wherein said main sensors and said adjacent reference sensors are induction coils positioned to have a voltage pulse induced therein by said moving magnetic field.